Oct. 13, 1959   J. P. RICH ET AL   2,908,390
APPARATUS FOR SCREENING PULP
Filed Jan. 28, 1958

INVENTORS
JOHN P. RICH
OSCAR LUTHI

INVENTORS
JOHN P. RICH
OSCAR LUTHI

Oct. 13, 1959   J. P. RICH ET AL   2,908,390
APPARATUS FOR SCREENING PULP
Filed Jan. 28, 1958                                    3 Sheets-Sheet 3
Fig. 3
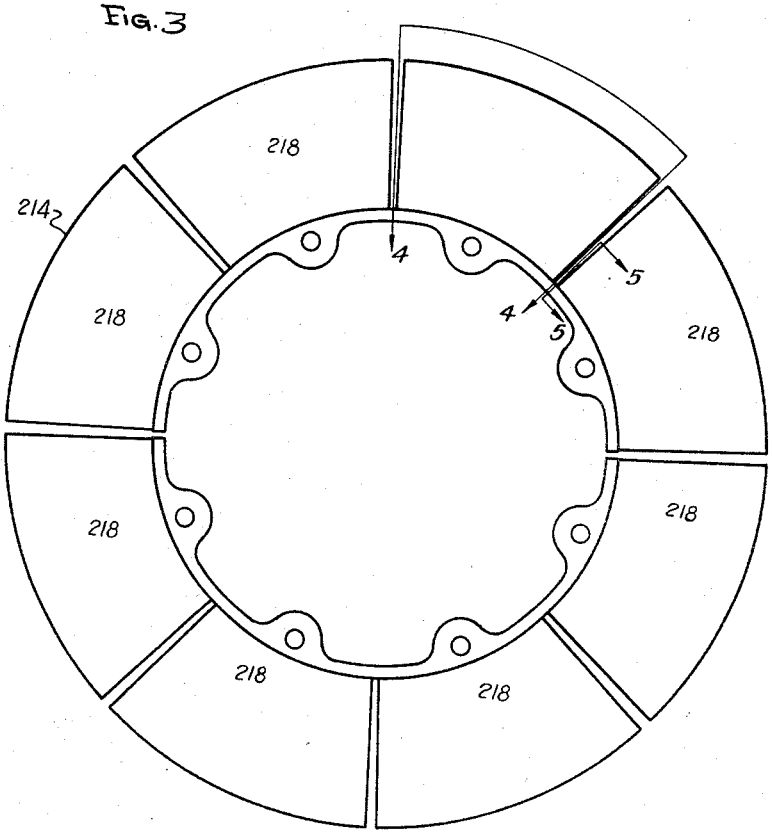
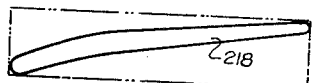
Fig. 4
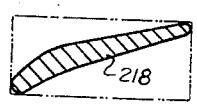
Fig. 5
INVENTORS
JOHN P. RICH
OSCAR LUTHI
By
Ross C. Munro United States Patent Office 2,908,390
Patented Oct. 13, 1959

2,908,390
APPARATUS FOR SCREENING PULP

John P. Rich and Oscar Luthi, Nashua, N.H.

Application January 28, 1958, Serial No. 711,704

5 Claims. (Cl. 209—273)

This is an improvement on the apparatus disclosed in Patent No. 2,845,848, dated August 5, 1958.

It is an object of this invention to provide an improved pulp screen having increased capacity over screens of the same size containing the same number of equal perforations.

It is a further object of this invention to provide a screen as aforesaid capable of screening stock at higher consistency than hitherto has been considered possible with this operation.

It is a further object of this invention to provide a screen as aforesaid which will operate at greatly reduced power per ton of pulp handled.

It is a further object of this invention to provide a screen as aforesaid in which dilution water may be supplied under minimum head.

It is a further object of this invention to provide a screen as aforesaid which in comparison with existing screens may be considered self-cleaning.

It is a further object of this invention to provide a screen as aforesaid in which the richness of the rejects easily and accurately may be controlled.

The above and other objects will be made clear from the following detailed description taken in connection with the annexed drawings in which:

Figure 3 is a plan view of the stator of the apparatus;

Figure 4 is an elevation taken on the line 4—4 of Figure 3; and

Figure 5 is a section taken on the line 5—5 of Figure 3.

Figure 1:
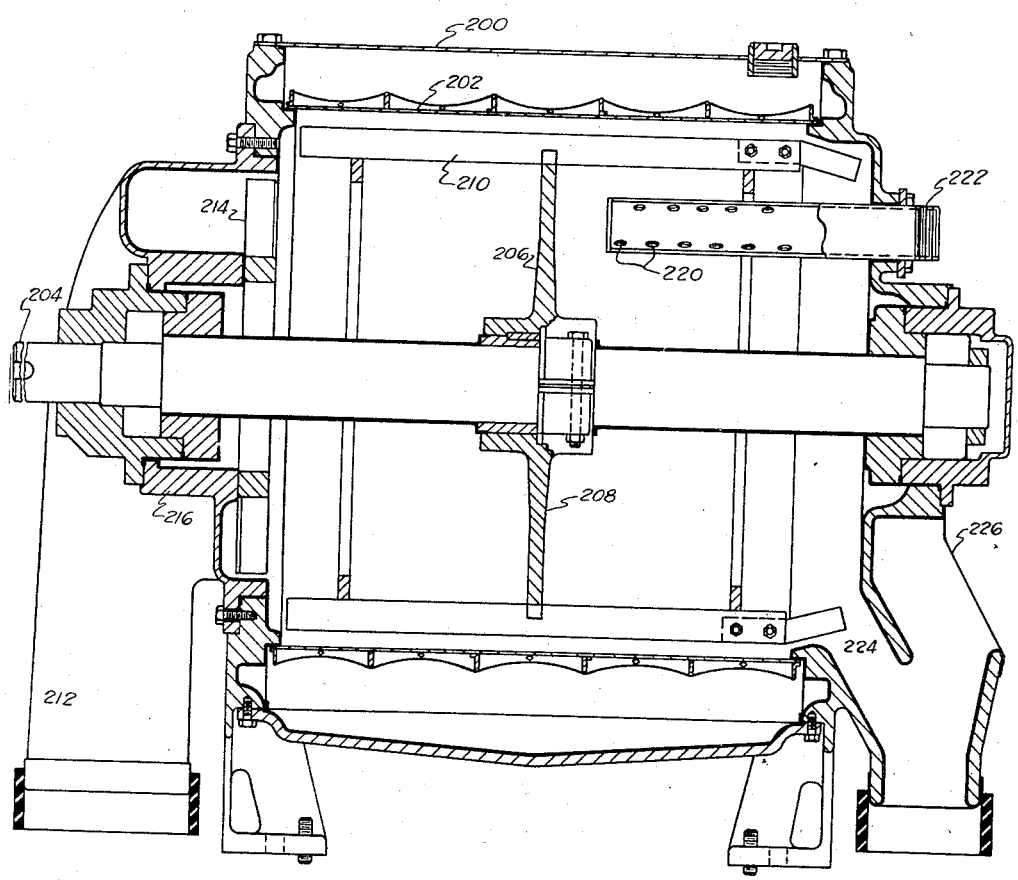
Figure 1 is a vertical section through the axis of the improved screen.

In a pulp mill, screening is done to separate coarser fibres from the fine or majority fibres and to remove dirt and foreign matter. The accepted fibres pass through the screen, the objectionable particles are retained by the screen. This is sharply to be distinguished from the mechanically similar operation of deckering or de-watering, in which almost all fibres are retained on the screen and only the water passes through the screen.

The size of the screen, the speed of the rotor and the size and shape of the screen perforations will vary with the type of pulp being screened. The specific dimensions, speeds and consistencies, etc. appearing hereinafter are based on the screening of pre-refined pine kraft stock, cooked to a permanganate number of 38–40. For other pulps, the quantities would be different but this disclosure will enable anyone skilled in the art to arrive at optimum quantities for any other pulp. This particular stock, due to the pre-refinement, makes it exceptionally difficult to keep the plates clean. It contains numerous "stringy" fibres which in screens of the prior art quickly results in a densely matted and knitted layer of fibres over the entire perforated plate surface. Using the present invention, however, at the end of 240 hours (10 days) of continuous operation, 95% of the perforations have been found to be clean.

The incoming stock must enter the screen under a reasonable substantial head and after entry, it must receive peripheral acceleration by means of the rotor blades. It is also clear that the peripheral velocity of the blades must exceed at all times the peripheral velocity of the stock and this differential, in conjunction with the profile of the rotor blades themselves, produces the suction effect which cleans the apertures of the screens. In the overall problem of this type of screen a considerable factor is that of total horsepower consumption. One way or another, a certain amount of horsepower is required to deliver the stock to the machine under an appropriate head. There are basically two theories of operation in screens of this type. The first of these relies entirely on the inlet head to produce flow through the screen and the rotor blades in cross-section are of hydrofoil or aerofoil in outline to produce a screen-cleaning suction effect. Such an apparatus requires relatively little horsepower input to the rotor but on the other hand, the rotor is limited in function exclusively to the cleaning of the screen. The second theory utilizes the rotor for peripheral acceleration of the stock whereby to add centrifugal force to the inlet head in order to drive stock through the screen. There is naturally some turbulence in the stock, which has a cleaning effect. This cleaning effect is reinforced by high pressure showers applied against the tailings portion of the screen. The result is quite effective screening, subject to a high shower water consumption running from 20 to 30% of the inlet stock volume. The apparatus shown in Figures 1–5 is designed to minimize total horsepower, to minimize the relative volume of shower or dilution water and to do this at increased inlet consistency without any letdown in overall efficiency of the screening operation.

Figure 2:
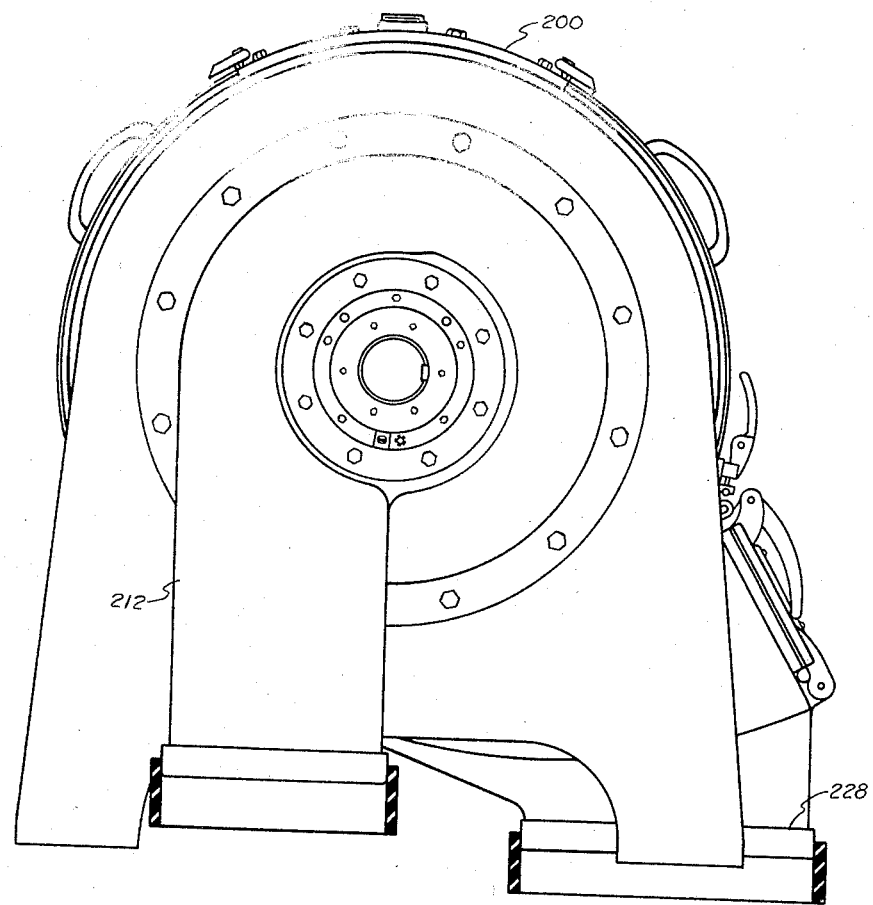
Figure 2 is an elevation of the inlet and of the apparatus.

Referring now to Figures 1 and 2, there is shown a casing 200 surrounding a screen 202. A shaft 204 penetrates both screen and casing and on it is mounted a rotor 206 made up of a central plate or diaphragm 208 similar to that shown in Patent 2,845,848 on which are mounted rotor blades 210, pitched and inclined as shown in said patent. Stock is admitted through an inlet casting 212 which is of three dimensional volute form and which serves in part at least, to give the inflowing stock a rotary motion. As the stock leaves the volute passage 212, it encounters a stator 214 (see Figures 3, 4 and 5) which clears the shaft 204 and is rigidly secured to an end plate 216 which forms part of the casing 200 as well as part of the inlet volute 212. The stator 214 is made up of a series of blades 218. These are pitched and profiled as shown in Figures 4 and 5 and serve to convert a large part of the static inlet head to a velocity head in the direction of rotation of the rotor. This makes for very uniform distribution of pulp into the screening chamber and allows the centrifugal force of the incoming stock to fling the pulp outwardly as it emerges from the stator and thus to utilize effectively the extreme left end of the screen 202, as seen in Figure 1. The volute inlet 212, it will be noted, has changed the flow direction from linear to rotating while retaining its velocity head and thereby forms distinctly a credit against total horsepower.

As the stock emerges from the stator 214 it is caught up by the rotor blades 210. These accelerate the stock and contribute centrifugal force to propel the stock through the screen. The peripheral speed of the blades will exceed the peripheral speed of the stock as it emerges from the stator 214 and therefore the blades will produce a moving ring of stock inside the screen having a centrifugal force and will also produce a suction or cavitation effect due to the differential in speed of the rotor and stock. Absolute dimensional requirements of blade width will vary with the type of pulp and the consistency at which it is admitted. The blade width need not be uniform over rotor length, for instance it could be wider at the inlet end or have up to a 45° twist with the greater stock propelling angle at the inlet. A good working figure, however, for pulp of the type above described, would be a rotor blade velocity of 40 feet per second as against the velocity of the stock of 5 to 10 feet per second emerging from the stator 214.

To the right of diaphragm 208, as seen in Figure 1, the stock will receive dilution water through perforations 220 in a pipe 222. Within this area a considerable proportion of the acceptable stock has passed through the screen and the concentration of rejectable fibre or particles has increased greatly.

By the time the acceptable stock and rejectable fibre have entered the zone to the right of diaphragm 208, the mass has gained in peripheral speed approximating the rotor speed. Since the dilution water added in this area has no rotating velocity, it tends to retard the rotation of the pulp mass, thus providing a speed differential between rotor blades and rotating mass which allows the blades to continue producing the desirable suction and cavitation action, with a minimum of peripheral acceleration and hence a minimum power consumption by the rotor in this stage. Rejects emerge through a channel 224 which has an opening 226 which permits easy sampling of the rejects. This is a particularly advantageous arrangement, since the drive is at the opposite end of the shaft 204. The richness of acceptable stock can be controlled with ease by varying the input of dilution water which washes out acceptable fibres apart from the oversized rejects. Accepted stock passing through the screens 202 goes to an outlet 228 as shown in Figure 2. With this apparatus only about 6% of total discharge volume represents shower water.

It is clear that the above described apparatus combines both of the above discussed screen theories while eliminating or at least minimizing the disadvantages of each.

As previously noted, specific dimensions, consistencies and rates of flow will be required to provide an optimum combination for any particular pulp and the mechanical details above described are susceptible of considerable variation without departure from the spirit of this invention. Accordingly, the invention is not to be limited to the details disclosed herein but only as set forth in the subjoined claims.

We claim:

1. In a pulp screen: a casing, a generally cylindrical screen within said casing said screen having a substantially horizontal axis; a volute shaped inlet passage communicating with the interior of said screen and acting to change inlet stock velocity from linear to rotating; a stator having spaced blades helicoidally directed, said stator receiving stock from said volute shaped passage and acting to convert inlet pressure head to rotary velocity head and to deliver stock directly to the interior of said screen; a rotor within said screen and means for driving the same in the direction of emergence of the stock from the stator; blades on said rotor adjacent said screen said blades receiving stock directly from said stator; means at the opposite end of said screen for supplying dilution water and a baffle secured to said rotor intermediate said stator and said dilution supply means.

2. A pulp screen as set forth in claim 1 in which the radial depth of the rotor blades diminishes from the inlet end of the rotor.

3. A pulp screen as set forth in claim 1 in which said rotor blades are helicoidally pitched to feed stock toward and over said baffle.

4. A pulp screen as set forth in claim 3 in which the radial depth of the rotor blades diminishes from the inlet end of the rotor.

5. A pulp screen as set forth in claim 4 in which the dilution water supply means directs the dilution water so as to act as a drag against rotation of the stock within the screen.

References Cited in the file of this patent

UNITED STATES PATENTS

| | | |
|---|---|---|
| 1,134,304 | Westbye | Apr. 6, 1915 |
| 1,856,176 | Trimbey | May 3, 1932 |
| 2,003,150 | Knight | May 28, 1935 |
| 2,337,113 | Knight | Dec. 21, 1943 |
| 2,845,848 | Bowen | Aug. 5, 1958 |